Jan. 8, 1957     M. A. CHAVANNES     2,776,451
APPARATUS AND METHOD FOR PRODUCING
EMBOSSED THERMOPLASTIC FILM

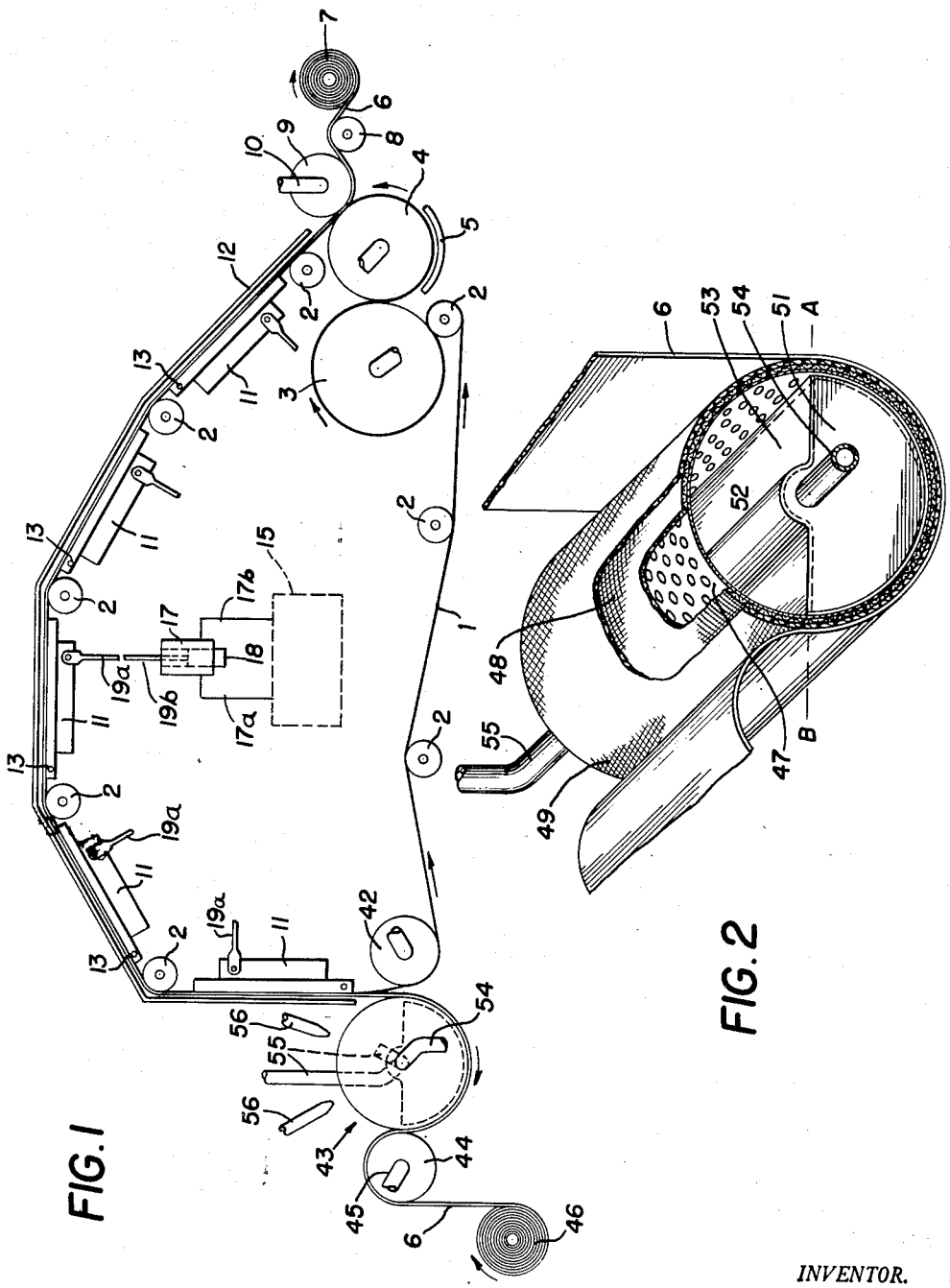

Filed Feb. 16, 1952     2 Sheets—Sheet 2

INVENTOR.
MARC A. CHAVANNES
BY
H. C. Dieserud
ATTORNEY

United States Patent Office 2,776,451
Patented Jan. 8, 1957

2,776,451

APPARATUS AND METHOD FOR PRODUCING EMBOSSED THERMOPLASTIC FILM

Marc A. Chavannes, New York, N. Y., assignor to Chavannes Industrial Synthetics, Inc., New York, N. Y., a corporation of Delaware Application February 16, 1952, Serial No. 271,935

3 Claims. (Cl. 18—10)

This application is a continuation-in-part of application Serial No. 62,703, filed November 30, 1948, by Marc A. Chavannes, now Patent No. 2,585,915.

The present invention relates to apparatus and a method for producing embossed thermoplastic film, and the like.

An object of the invention is to emboss thermoplastic film, particularly thin film, or flexible sheet material having at least one thermoplastic face, so as to produce, rapidly and inexpensively, attractive, well-defined, embossed patterns.

In Patent 2,585,915, the various difficulties of embossing thermoplastic film were explained. There was described therein an embossing method and apparatus featuring, in one embodiment, applying a thermoplastic film to an advancing carrier belt, heating the film while on the carrier to a softening temperature, then bringing the hot, soft film into contact with a cool embossing roller, holding the film against the embossing roller as it passes around the roller throughout an extended arc, so that the film becomes first embossed and then set while passing through this arc, and thereafter stripping the film from the embossing roller and from the carrier belt.

The method and apparatus of the present application have some features in common with the previously-described method and apparatus, particularly in that the film is pre-heated and is then passed around a relatively cool embossing roller through an extended arc, being embossed and set while passing around this roller. A feature of the present application is that the embossing roller is perforated or porous, and a suction is applied to the interior thereof, for drawing the hot, soft film against and down into the embossing surface of the roller. The embossing surface may, in one form, be the perforated surface of a drum or cylinder which may serve as the roller, but in the preferred embodiments, the embossing surface may be in the nature of a sleeve which is carried by the perforated drum. For example, the drum may carry an outer sleeve of fabric or other material which is porous and which also has surface characteristics adapted to provide an embossing surface. Other examples of embossing members will be described in more detail at a later point.

The embossing roller to be described herein is divided on its interior into two zones, a first one where suction is applied, and a second one where there is no suction. In the suction zone the film engages the embossing surface and, because of the suction, is embossed thereby. The second zone corresponds to the zone where the film is not engaging the embossing surface, and in this second zone means may be provided for cooling the roller and its embossing surface.

The films embossed by the present arrangement will, in general, particularly if they are thin, have an embossed pattern on the back surface, as well as on the surface which engages the embossing surface.

Among the advantages of the present invention are the fact that surprisingly deep and uniform embossed patterns can be produced on even thin film rapidly and inexpensively. Moreover, a wide variety of highly desirable patterns may be produced by employing as the active embossing surface of the embossing roller material, for example fabrics, which can be purchased on the open market. The good qualities of embossing produced, and the practicability of surfacing the embossing roller with materials of the types described herein, flow from the use of suction to create the embossing pressure.

An additional feature of the present invention is the provision of steps which may be employed for causing the finished product to be capable of withstanding the application of heat without losing its embossed pattern. This is accomplished by applying a layer of plastisol to one surface of the embossed film, for example, the back surface if this surface has on it a duplicate negative of the pattern appearing on the front face. Some embossed film may have a rather deep embossing, including deep indentations on its front face, and in this case these indentations may be partly filled with a layer of plastisol. After application of the layer of plastisol in either of these manners, this layer is fused with the aid of heat. When the resulting film is, during use, subjected to heat, for example, if it is used as a table cloth and a hot dish is set down on it, the embossed pattern will not be lost.

As a variation, instead of embossing film alone, one may, by the method and apparatus described herein, emboss knitted fabrics coated with a thermoplastic layer or laminated to a thermoplastic film. One may also, by this method and apparatus, emboss a thermoplastic film laminated to a fabric which includes a major portion of thermoplastic filaments or fibers. In some cases one could likewise emboss a thermoplastic film laminated to a very open fabric of cotton or other natural fibers. Other equivalent materials having thermoplastic faces could be embossed with this method and apparatus.

Further objects, features and advantages will appear from the more detailed description set forth by way of illustration, which will now be given in conjunction with the accompanying drawings, in which:

Fig. 1 is a schematic elevational view of embossing apparatus;

Fig. 2 is a perspective view of one form of the embossing roller of Fig. 1.

Figure 3:
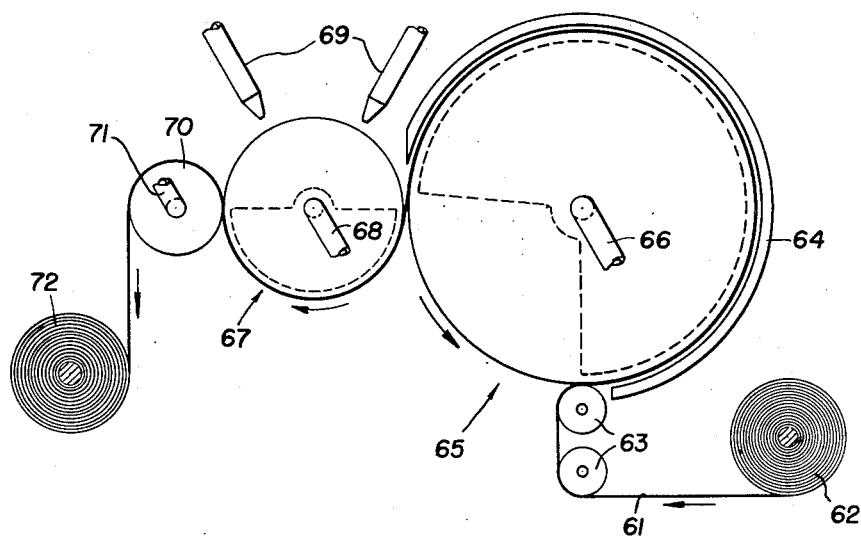
Figs. 3 and 4 are schematic elevational views of different forms of embossing apparatus.

There is provided, in the embodiment of Fig. 1, a metal carrier belt 1, which may be of mesh or other porous or perforated construction, supported by a plurality of guide rollers 2. The belt 1 is advanced continuously by suitable means. Thus for this purpose one or more of the rollers 2 may be positively driven in synchronism with each other and with other rollers which engage and advance the film. There are advantages in having the belt 1 made of metal, particularly one including a large amount of copper. Stainless steel or nickel may also be used.

The belt 1 serves as one form of a carrier to which the film is temporarily bonded. Prior to the application of the film to it, the carrier belt is passed over a plurality of large heating rollers 3 and 4. The rollers are heated by steam, supplied through the pipes shown. The rollers 3 and 4 should raise the film to a temperature above its softening point and below its heat-sealing point, say to 180° F., for a film which starts to soften at 150° F. and heat seals at 400° F. If desired, additional heating means such as of the radiant type, schematically illustrated as a heater 5, for elevating the temperature of the carrier belt, may be provided. Other arrangements for heating the carrier belt may be employed. For example, it may be heated by passing it through an oven. Means are provided for positively driving the roller 3, for advancing the carrier belt.

The thermoplastic film 6, which in the illustrative embodiment may be assumed to be a vinyl chloride polymer, may be carried by a reel 7, being drawn from this reel over a guide roller 8. It is thereafter pressed by a pressure roller 9 against a surface of the hot belt 1. The roller 9 is, in the illustrated embodiment, cooled to approximately 40°–60° F. by running tap water through it via a pipe 10. The temperature of the roller 9 should at any rate be lower than that of the carrier 1 in order that the film 6 may adhere to carrier and not to the roller 9. It will be understood that while water has been suggested as a cooling fluid for the roller 9, other cooling fluids might be employed.

The carrier belt 1 and the film 6 are thereafter passed over heating means, such as electrical heating units 11 opposed to the exposed surface of the carrier, opposite that to which the film is bonded. Reflectors 12 may be provided opposed to the exposed surface of the film.

It is particularly advantageous to locate the active heaters 11 on only the side of the carrier opposite the side to which the film is bonded. This procedure, combined with the use of a carrier belt which is a good heat conductor, such as one of metal, provides uniform heating of the film.

The heating units 11 may advantageously be adapted to be moved away from or toward the carrier belt. Thus in the illustrated embodiment they are mounted for pivotal movement about an axis toward their left-hand end, at 13. In one arrangement, as described in earlier mentioned Patent 2,585,915, in order that the film may always be heated to approximately the same temperature by the time it reaches the embossing roller, regardless of the speed of movement of the carrier, the position of the heating units 11 is automatically adjusted in relation to the speed of the carrier. That is, the separation of the heating units from the carrier is varied inversely with the speed of the carrier. Thus when the carrier moves slowly, these heating units should be swung somewhat away from the carrier. When the carrier is stopped, they should be swung a considerable distance away from the carrier, in order to avoid overheating of the film. In the illustrated embodiment, there is provided a solenoid having a winding 17 and a movable armature 18 adapted to be attracted by the winding 17. The armature 18 is mechanically coupled to the heating units 11 by suitable means. In the illustrated embodiment such means are schematically shown as rods 19a pivotally carried by the heating units, and rod 19b carried by the armature. These rods 19a and 19b will be understood to represent schematically a suitable mechanical linkage coupling the armature 18 and the heating units 11 in such a way that as the armature is attracted farther into the winding, the linkage drives the heating units 11 closer to the carrier 1. Suitable means, such as springs, are provided for yieldingly urging the heating units 11 away from the carrier.

Current is supplied to the winding 17 through lead wires 17a and 17b from a control device 15, which includes a current source. The control device 15 may be automatically controlled in response to the speed of the carrier, as described in more detail in Patent 2,585,915. Alternatively the control device 15 may be controlled manually, or in some other manner. It may, for example, be so arranged that current is supplied to the winding 17 when the carrier is in motion, but no current is supplied when the carrier is stopped. It will be understood that when a current of sufficient magnitude is supplied to the winding 17, the armature 18 will be drawn into the winding, and will, through the couplings 19a and 19b, move the heaters toward the carrier. Conversely, in the absence of current in the winding 17, the heaters will be moved away from the carrier by the springs, not shown, which urge the heaters away from the carrier.

The heating units should be adapted to raise the film to an embossing temperature, for example, about 350° F. by the time it contacts the embossing roller.

After leaving the heating zone, the carrier belt 1 and the film 6 are separated, the carrier belt passing around a heated roller 42 and returning to its starting point. The hot, soft film passes around an embossing roller, generally designated as 43, through an extended arc of substantial magnitude, shown as approximately 180°.

In one arrangement, which has unique advantages, the roller 42 is positioned far enough away from the embossing roller 43 that no pressure is exerted by one against the other. There may, for example, be a definite clearance between the two rollers, as shown in Fig. 1. Such an arrangement is particularly advantageous when the embossing roller 43 is of such construction that high pressure by the roller 42 toward the embossing roller 43 would cause the embossed pattern on the film to be disturbed, or would damage the surface of embossing roller. For example, when the surface of the embossing roller is fabric, this may be the case. With this arrangement the roller 42 serves chiefly to guide the carrier belt, and thereby to guide the film into juxtaposition with the embossing roller 43. The embossing pressure is created entirely by suction within the roller 43.

In another arrangement, which serves a somewhat different purpose, the roller 42 is pressed toward the roller 43 so as to form a nip therebetween, thereby, by means of the pressure exerted through the carrier, pressing the film against the embossing surface along a relatively narrow line in the region where the film first contacts the embossing roller. In this arrangement, a major portion of the embossing is accomplished in the region of the roller 42, which would serve as a backing roller, and the suction throughout the subsequent extended arc where the film contacts the embossing roller causes supplementary embossing and aids in maintaining the embossed effect while the film cools and sets. The embossing roller 43 is positively driven in synchronism with the roller 3, which advances the carrier. The embossing roller is of perforated or porous construction, as will be more fully described at a later point. Means are provided for sucking air from a portion of the interior of the embossing roller so as to draw the film against the surface of the embossing roller, which is shaped to define a design, and the suction holds the film in engagement with the roller throughout its passage through the aforementioned extended arc around the roller. In this manner the film is embossed.

Regardless of whether the embossing pressure is applied by the suction alone, or by the suction in combination with a backing roller, care should be taken that some embossing pressure is applied before the cool embossing roller appreciably cools and hardens the hot, soft film. For this reason, in the arrangement shown in Fig. 1, the suction zone should begin at least as early a point as the region where the film first contacts the cool embossing roller.

When thin films are used, the embossed pattern will appear both on the surface of the film which contacts the embossing roller and on the opposite surface, because portions of the film will tend to be drawn down into the embossing roller by the suction. The embossing roller is maintained at a cool enough temperature that the film, in passing around it through the extended arc, will become set sufficiently so that it can retain its pattern when removed from the roller. The film is then transferred from the roller 43 to a roller 44. The roller 44 is chilled by running tap water or other cooling fluid through it via a pipe 45. In this manner the film is further cooled, and is then wound up on a reel 46.

Details of the construction of an illustrative form of the embossing roller 43 are shown in Fig. 2. This roller includes a perforated inner drum or cylinder 47, which may, in one embodiment, be covered by a layer of wire mesh, 48, and one or more outer layers of fabric or other material for providing an embossing surface. In many cases the wire mesh will be omitted altogether so as to decrease the amount of air leakage from edge areas into the section chamber of the roller. One advantage of an embossing surface of fabric is that it may produce a very fine embossed pattern on the film, simulating fabric, and a further advantage is that the fabric layer is porous, which enables the suction within the roller to affect the film.

The illustrated embossing roller is, on its interior, divided into two chambers, a lower or suction chamber 51, and an upper chamber 52, by a transverse member 53. It will be understood that the transverse member 53 remains stationary while the cylinder 47, with its layers 48 and 49, rotates. Hence the suction chamber 51 is always in the same position, at the bottom in this illustration. Means, such as a pipe 54, extending into the lower chamber 51, are provided for sucking air out of the lower chamber. At the edges of the transverse member 53, gaskets (not shown) of felt or the like are provided for engaging the rotating cylinder 47, so that the suction may be more effective throughout the suction zone, which is indicated as lying in the lower arc between the points A and B.

Means are provided for cooling the roller, since it would, if not cooled, tend to become hot after it had received the hot film for some length of time. For this purpose, cool air may be blown into its interior through a pipe 55, being directed only into the upper chamber of the roller. Cool air may additionally be blown onto the exterior of the upper chamber of the roller through a pipe 56.

Reference is now made to Fig. 3, which shows a different form of apparatus from that shown in Fig. 1. In this embodiment, the film 61 is drawn from a reel 62, over guide rollers 63, and is heated by radiant heaters 64 while it passes around a suction roller 65. Additional radiant heaters may also be provided within the roller 65, to aid in raising the film to its softening temperature by the time it reaches the end of its path around the roller 65. For holding the film smooth, and for retaining it in position on the roller 65, the air pressure within this roller is lowered throughout a suction zone coinciding with the arc where the film engages this roller, air being pumped from this region through a pipe 66 by pumping means, not shown. The suction zone is partitioned from the remainder of the interior of the roller 65 in much the same manner as is illustrated in Fig. 2 with respect to the transverse partition member 53 of the roller 43. The suction zone of the roller 65 may extend through an arc of the order of 270° or more. In the remaining zone of the roller 65 the pressure is atmospheric, thereby facilitating release of the film by this roller. Additional heaters for the roller 65 may be located within the roller in this zone, and also outside the roller in this region.

The circumferential portions of roller 65 are of porous construction, and may, in one embodiment, include a perforated inner cylinder, and an outer layer of a porous, substance, for example, metallic mesh, fiberglass, or asbestos. The roller 65 should be capable of withstanding temperatures at least equal to the softening temperature of the film. The outer layer may be generally smooth, although porous.

After passing around the roller 65, the film is transferred to an embossing roller 67, which may be of the same construction as the embossing roller 43 of Fig. 1, which has been described in connection with Fig. 2. The film is held against the embossing roller 66 by suction, and is embossed and then cooled while passing around this roller through an extended arc.

The suction within the embossing roller 67 is maintained through a pipe 68. Cool air may be blown onto the embossing roller 67 through pipes 69, and also into the roller by means, not shown, like the pipe 55 of Fig. 1.

After having been embossed, the film is transferred to and passed around a cooling roller 70, cooled by a fluid through a pipe 71. Thereafter the cool, embossed film is wound up on a reel 72.

The apparatus of Fig. 3 may, with certain unique advantages, have the embossing pressure supplied by suction alone. In this case the roller 65 would not press the film against the embossing roller 67, being spaced therefrom as shown in Fig. 3. In another arrangement, the roller 65 would press the film against the embossing roller 67, so as to produce some initial embossing, and the suction would, with less pressure, produce some subsequent embossing of the film and would maintain the embossed pattern while the film sets.

Still another variation, generally similar to Fig. 3, is that a porous belt may be passed around the suction roller 65 and around a guide roller, and the film may be applied to this belt prior to heating of the film. In this variation the belt would not pass around the embossing roller 67.

Figure 4:
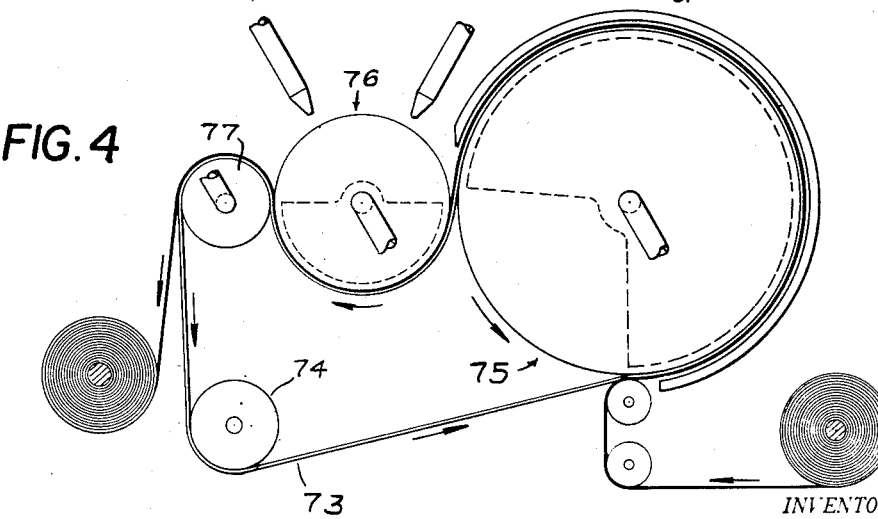

Another variation, which has certain unique advantages is shown in Fig. 4. In this embodiment a porous carrier belt 73 and a guide and tension roller 74 for it have been combined with the other apparatus shown in Fig. 3. The carrier belt 73 may be of metallic mesh construction. It passes around the heating suction roller 75, inside the film, passes through an extended arc around the cool, embossing suction roller 76 outside the film, and around the cooling roller 77, inside the film. Because of the porous nature of the carrier belt 73, the suction of the rollers 75 and 76 is particularly effective. On the roller 75 the suction is applied through the porous carrier belt. The film becomes only lightly bonded to the porous carrier belt, and the suction embossing roller 76 is capable of producing a well-defined embossing effect, which appears on both sides of the film, in the case of thin films. The elements of Fig. 4 not specifically described above are like those of Fig. 3.

If desired, the film produced as described herein may be used without further treatment. On the other hand, the film may be materially improved in its capability of withstanding the application of heat while in use without losing its embossed pattern, if it is further treated as will be described herein. It will be understood that it is advantageous if the embossed film can withstand the application of heat without significant change in its surface characteristics. If, for example, the embossed film is used as a table cloth, it is desirable that, when warm or hot dishes are set on the film, the film not buckle or lose its embossed pattern.

To improve the properties of the film in these respects, particularly in the case of thin films which, as described above, will emerge from the apparatus of Fig. 1 bearing an embossed pattern on both faces, the indentations on the back face are filled by forming on this face a continuous layer of a plastisol. As an illustration, a suitable plastisol which may be used for this purpose on embossed vinyl films may be formed by mixing the following components, the parts indicated by weight:

| | Parts |
|---|---|
| Vinyl resin | 100 |
| Plasticizer | 50 |
| Stabilizer | 2 |
| Fillers or coloring agents | 8 |

The vinyl resin may comprise primarily a polymer of vinyl chloride of high molecular weight. It may include a relatively small proportion of vinyl acetate, say less than 5%. The resin should be of the type especially prepared for plastisols, being of fairly uniform particle size, and the surface of the particles should be comparatively small relative to their volume. A suitable resin for this purpose is sold by the Bakelite Division of Union Carbide & Carbon Corporation under the trademark "QYNV."

Another suitable resin is sold by B. F. Goodrich Company under the trademark "201."

The plasticizer may comprise 25 parts di-2-ethylhexyl-phthalate and 25 parts of tri-octyl-phosphate.

The stabilizer may comprise lead di-phosphate. For example, a suitable stabilizer of this type is sold by the National Lead Company under the trademark "Dyphos."

If the pattern on the embossing roller and the thickness of the film are such as to produce a very deep embossed pattern on the front face of the film, this pattern may be partly filled with a plastisol, so as to leave some visible pattern, but so as to render the film and its pattern more durable.

After application of plastisol to one or both surfaces of the embossed film, the film bearing the plastisol is raised to a temperature which will fuse the plastisol, say 300° to 350° F. During this fusing process, the viscosities of the film and of the plastisol at different temperatures are so related as to cause the embossed pattern to be retained. That is, initially, the plastisol is quite soft, and the film is firm. At a higher temperature, the film begins to soften, and might tend to lose its embossed pattern, except for the fact that the layer of plastisol is, at this higher temperature, jellified to a considerable extent, and causes the pattern to be retained. At still higher temperatures, the film tends to loose a large part of its power to contact. After the film and the layer of plastisol have cooled, both the film and the plastisol will be firm. When, during use of the film, heat is applied to its, the plastisol serves to hold the film in its embossed shape. More particularly, an embossed film including on its rear surface concave regions filled with plastisol will be able to withstand heat because the plastisol which fills these regions tends to prevent the loss of the embossed pattern on the front surface. It is believed that this product is new and very useful.

A number of variations of the method and apparatus may be employed. Thus the embossing roller might take any of the following forms, which are illustrative, and are not intended as a complete list of suitable variations.

1. An inner perforated drum, and one or two layers of porous fabric over the wire mesh
2. A perforated drum, with no outer layers
3. A perforated drum and one or two outer layers of porous fabric
4. A porous inner cylinder, a layer of coarse, porous material, and an outer layer of lace or the like
5. In combination with any of the above, or instead of the outer layers described above, one may use, as an outer layer, porous embossed paper, or leather or perforated laminated products, or woven material, including basket material made from canes, reeds and the like, or pile fabrics, such as rug material.

It will be understood that one variation of the apparatus shown in Figure 4 supplies the embossing pressure only by the combined effects of the suction within the embossing roller 76 and the tension in the carrier belt 73. This variation, has unique advantages, particularly when an embossing roller having a surface of fabric or the like is employed.

In another variation, the roller 75 presses the carrier belt 73 toward the embossing roller 76 so as to produce a relatively high embossing pressure in the region of the initial line of contact of the film with the embossing roller.

In one good mode of operation, particularly for high speed embossing of thin film, the film may, during the heating step, prior to its application to the embossing member, be raised to such a high temperature that it would not be self-supportable without serious distortion were it not carried by a support. In the apparatus of Figures 1 and 4 the carrier belt supports it while it is being heated and while it is being transferred from the heating zone to the embossing roller. One mode of operating the apparatus of Figure 3 is to heat the film to such a high temperature that it is not truly self-supportable without distortion, but that it is capable of being satisfactorily transferred from one suction roller to another in juxtaposition therewith, as indicated in Figure 3.

Among the numerous advantages of the method and apparatus shown in the drawings are that by preheating the film, the embossing pressure can be very light, and by distributing the embossing pressure over a considerable area and throughout an extended path, with the aid of suction, the embossing pressure can be even lighter. As a result, fabrics and other readily available substances in a variety of patterns may be employed as the surface for the embossing roller. If very high pressures were employed, there would be a tendency to distort these substances, and hence they would not be so suitable for the embossing surface.

The outer layers of fabric or the like can be readily applied to the embossing roller by wrapping a strip of the desired fabric around the roller and allowing the free ends of the strip to be held on the surface of the roller. The strip of fabric can be drawn tight around the roller and be stuck in position or rewoven together.

It will be understood that in all the embodiments illustrated the material to be embossed should be so oriented that the main thermoplastic face which is to be embossed will be next to the embossing roller. Of course in some cases, as is explained herein, the result will be that both faces will be embossed.

Although the present invention is particularly applicable to embossing thermoplastic films, and especially thin thermoplastic films, one may also, by this method and apparatus, emboss knitted fabric coated with a thermoplastic layer, or laminated to a thermoplastic film. The general teachings of the invention are also applicable to embossing a thermoplastic film laminated to other open-mesh fabrics of cotton or other natural fibers. As a further variation, one may similarly emboss a thermoplastic film laminated to a fabric which includes a major portion of thermoplastic filaments or fibers. For best operation, the web being embossed should be quite flexible, and those portions of the web which are not thermoplastic should be porous.

It will be understood that, in the appended claims, where the embossing roller is referred to as "porous," the expression porous is to be interpreted broadly enough to include a perforated construction.

While a suitable form of apparatus, mode of procedure, and improved product in accordance with the invention have been described in some detail, and certain modifications have been suggested, it will be understood that numerous changes may be made without departing from the general principles and scope of the invention.

I claim:

1. A method for embossing thermoplastic film having a narrow softening temperature range for accurately reproducing the design in an embossing surface under low pressure, comprising applying said film to a continuously-advancing support, heating said film while on said support to a softening temperature within said range, thereafter passing said hot, soft film from said support and quickly delivering it without substantial loss of heat to a porous, rotating, embossing roller, maintaining said roller at a temperature substantially below said softening temperature, including the region of said roller where said film first contacts it, sucking said film against said roller, while passing it around the same, over a substantial, extended arc by lowering the air pressure within said roller in the region of said arc below atmospheric pressure, exposing the outer face of said film to the atmosphere in the region where said film first contacts said roller, whereby said film is sucked against said roller and thereby embossed, said extended arc being long enough and said roller being cool enough to enable said film to cool to a temperature at which it sets while still in contact with said roller, and thereafter removing said film from said roller.

2. In apparatus for embossing thermoplastic film having a narrow softening temperature range for accurately reproducing the design in an embossing surface under low pressure, in combination, a first continuously rotating roller, means for feeding a thermoplastic film to said roller, means for heating said film while it is on said first roller to a hot and soft condition, a cool, continuously rotating, porous embossing roller for receiving said hot soft film from said first roller, said embossing roller being spaced from said first roller but positioned so close to the same as to enable quick delivery of said film from said first roller to said embossing roller without substantial loss of heat, means continuously rotating one of said rollers in a clockwise direction and the other of said rollers in a counter-clockwise direction to advance said film along a generally S-shaped path passing around said roller through an arc, then unsupported through the air only for a short distance from a point of tangency with one of said rollers to a point of tangency with the other of said rollers, and then around said embossing roller through an extended arc, means for applying a suction to the interior of said embossing roller for embossing said film in the region where said hot, soft film first engages said porous embossing roller, and means for removing said embossed film from said embossing roller.

3. Apparatus according to claim 2, in which said embossing roller includes, around its periphery, a layer of porous fabric forming the embossing surface of said roller, bearing said design.

References Cited in the file of this patent

UNITED STATES PATENTS

| | | |
|---|---|---|
| 795,359 | Moore | July 25, 1905 |
| 986,162 | Gare | Mar. 7, 1911 |
| 1,115,183 | Enslin | Oct. 27, 1914 |
| 1,358,289 | Cigol | Nov. 9, 1920 |
| 1,516,598 | Griffiths | Nov. 25, 1924 |
| 2,033,855 | Sloan | Mar. 10, 1936 |
| 2,152,101 | Scherer | Mar. 28, 1939 |
| 2,354,916 | Hurt | Aug. 1, 1944 |
| 2,472,551 | Smith | June 7, 1949 |
| 2,493,439 | Braund | Jan. 3, 1950 |
| 2,567,275 | Colombo | Sept. 11, 1951 |
| 2,660,757 | Smith et al. | Dec. 1, 1953 |